United States Patent Office 2,737,506
Patented Mar. 6, 1956

2,737,506

METHOD FOR PREPARING ORGANOPOLYSILOXANE USING CESIUM HYDROXIDE

Dallas T. Hurd, Burnt Hills, and Robert C. Osthoff, Schenectady, N. Y., assignors to General Electric Company, a corporation of New York No Drawing. Application June 9, 1953,
Serial No. 360,595

5 Claims. (Cl. 260—46.5)

The present invention relates to the production of higher molecular weight organosiloxane polymers from relatively low molecular weight condensed siloxanes. More particularly, the invention is concerned with a process which comprises forming a mixture of ingredients comprising (a) a cyclic polydimethylsiloxane having the formula $[(CH_3)_2SiO]_m$ and (b) a cyclic polysiloxane selected from the class consisting of (1) a cyclic polydiethylsiloxane having the formula $[(C_2H_5)_2SiO]_n$ and (2) a cyclic polydiphenylsiloxane having the formula $[(C_6H_5)_2SiO]_p$, where $m$ is an integer equal to from 3 to 9, inclusive, $n$ is an integer equal to from 3 to 5, inclusive, and $p$ is an integer equal to from 3 to 4, inclusive, thereafter adding a small amount of cesium hydroxide to the above-described mixture of ingredients, and heating the mixture of polyorganosiloxanes and cesium hydroxide to give a product of higher molecular weight (e. g., from about 100,000 to 1,500,000 molecular weight) than any of the original starting ingredients, in which reaction product there are dimethylsiloxy units intercondensed with the other co-reacting diorganosiloxy units.

The use of certain alkaline materials for converting organopolysiloxanes, particularly completely condensed cyclic organopolysiloxanes from lower molecular weight products to higher molecular weight products is known. Thus, in U. S. Patent 2,490,357—Hyde, there is disclosed the use of certain alkali-metal hydroxides for condensing organopolysiloxanes in which the organic groups in the organopolysiloxanes are the same, for instance, mixtures of cyclic polydimethylsiloxanes, various individual cyclic polydimethylsiloxanes themselves, cyclic polydiphenylsiloxanes, cyclic polymethylphenylsiloxanes, and cyclic polydiethylsiloxanes.

In carrying out the reaction described in the above-mentioned Hyde patent, little difficulty is ordinarily encountered if the condensation reaction is confined to condensing cyclic dialkyl siloxanes in which the alkyl group in the siloxanes is the same, or condensing cyclic alkyl aryl siloxanes in which the alkyl and aryl groups are the same throughout, although in many of these cases, the condensation will not proceed to the formation of the gel or gum-like products suitable for processing into elastomeric materials because of the limitations of the reaction conditions as described in the aforesaid patent. However, when attempts are made to intercondense, for instance, a cyclic dimethylsiloxane, for instance, hexamethylcyclotrisiloxane, or octamethylcyclotetrasiloxane, with either cyclic diethylsiloxanes or cyclic diphenylsiloxanes of the formula $[(C_2H_5)_2SiO]_n$ and $[(C_6H_5)_2SiO]_p$, respectively, where $n$ and $p$ have the meanings given above, it will be found that due to the fact that at the higher temperatures required for causing reaction by means of the alkali-metal hydroxides described in the said Hyde patent, e. g., KOH, the rate of condensation of the different cyclic diorganosiloxanes is different, so that true, satisfactory intercondensation is rarely obtained because the more reactive cyclic diorganosiloxane would condense first, leaving the less reactive cyclic diorganosiloxane to condense by itself, so that a true interpolymer was not attained in which each cyclic diorganosiloxane is intercondensed with the other cyclic diorganosiloxane. Also, dealkylation reactions may occur at the higher temperatures necessary for rapid condensation with alkali-metal hydroxides, such as lithium, sodium and potassium hydroxides, leaving the final product considerably cross-linked and less desirable as a material for the preparation of elastomers.

In addition it has also been found that alkali-metal hydroxides, such as sodium hydroxide and potassium hydroxide, under condensation conditions require prolonged times and elevated temperatures to obtain the desirable higher molecular weight products. Obviously, for production purposes, the faster the reaction which can be carried out, the more economical will be the process. Although rubidium hydroxide disclosed in the above-mentioned Hyde patent does give rates of reaction faster than either sodium hydroxide or potassium hydroxide, nevertheless the rate of condensation obtained with rubidium hydroxide is still not as rapid as would be desired. Finally, it has been found that intercondensation of certain mixtures of diorganosiloxanes, for instance, a mixture of cyclic dimethylsiloxanes such as octamethylcyclotetrasiloxane, with octaphenylcyclotetrasiloxane is difficult to effect and is usually inhibited if a slight amount, e. g., 0.5%, by weight, of the hexaphenylcyclotrisiloxane, an impurity normally associated with, and difficult and uneconomic to remove from, octaphenylcyclotetrasiloxane, is present in the mixture of ingredients.

Unexpectedly we have discovered that the use of particular alkali-metal hydroxide, specifically, cesium hydroxide, obviates the difficulties recited above. Thus, by means of the use of small amounts of cesium hydroxide, it is possible to obtain true intercondensation products by reacting, for instance, cyclic dimethylsiloxanes, the formula for which has been given above, with either cyclic diethylsiloxanes, or with cyclic diphenylsiloxanes, to give homogeneous, intercondensed products, while at the same time effecting such intercondensation and great increase in molecular weight and viscosity (about a 10 to 100 or fold increase) of the reaction product at an extremely rapid rate. This rate of reaction is so rapid that the use of cesium hydroxide recommends preparation of the higher molecular weight polyorganosiloxanes on almost a continuous basis, which was not heretofore feasible commercially due to the sluggish rate of reaction induced by such alkali-metal hydroxides as, for instance, lithium hydroxide, sodium hydroxide or potassium hydroxide.

It is thus an object of the present invention to provide methods for the rearrangement of completely condensed relatively low molecular weight organosiloxane mixtures to produce higher molecular weight products in which the latter comprise homogeneously intercondensed diorganosiloxy units wherein each of the diorganosiloxy units of the starting materials constitutes a portion of the final product in essentially the same ratio as it was in the mixture of starting ingredients.

A still further object of the invention is to effect intercondensation of a mixture of diorganosiloxanes of the type described above at a rate which has not heretofore been accomplished by the use of similar condensing agents such as sodium hydroxide and potassium hydroxide.

Another object of the invention is to effect intercondensation of cyclic dimethylsiloxanes with octaphenylcyclotetrasiloxane, even though there may be present appreciable amounts of hexaphenylcyclotrisiloxane.

Among the cyclic polydimethylsiloxanes which may be employed in the practice of the present invention are, for example, hexamethylcyclotrisiloxane, octamethylcyclotetrasiloxane, decamethylcyclopentasiloxane, dodecamethylcyclohexasiloxane, hexadecamethylcyclooctasiloxane, etc. Included among the polydiethylsiloxanes which may be employed are, for instance, hexaethylcyclotrisiloxane, octaethylcyclotetrasiloxane, and decaethylcyclopentasiloxane. The cyclic polydiphenylsiloxanes employed in the practice of the present invention are specifically octaphenylcyclotrisiloxane and hexaphenylcyclotetrasiloxane. It will be understood by those skilled in the art that partially condensed siloxanes, containing a small percentage of silanol groups as chain-terminating groups, will be operative within the scope of this invention.

In accordance with a preferred form of this invention intercondensed higher molecular weight organosiloxanes are prepared from lower molecular weight ingredients by contacting the mixture of diorganosiloxanes with cesium hydroxide in an amount equal to at most about 2%, by weight, based on the weight of the mixture of organopolysiloxanes. Generally we have found that good results including a relatively rapid intercondensation may take place when the amount of cesium hydroxide present in the mixture of diorganosiloxanes is as low as about 0.001%, by weight. A range which we have found to be advantageous and useful is an amount of cesium hydroxide in the range of from about 0.002 to about 0.5%, by weight. Obviously the rate at which the intercondensation will proceed to yield the finally desired condensed product will vary with the type of diorganosiloxanes employed, the proportions of the various diorganosiloxanes, particularly the proportion of the more difficulty intercondensible siloxanes, for instance, the cyclic diethylsiloxanes and the cyclic diphenylsiloxanes present in the mixture, the proportions of cesium hydroxide used, the temperature, etc.

In effecting the copolymerization of the mixtures of diorganosiloxanes with cesium hydroxide, it is preferable, because of the difference in rate at which the various diorganosiloxanes will undergo polymerization, to heat the desired mixture of diorganosiloxanes to a suitable reaction temperature generally about 100 to 150° C. Thereafter, the cesium hydroxide is added to the mixture of ingredients to effect the polymerization (or intercondensation) reaction. By adding the cesium hydroxide at this point, premature polymerization and gelation of one component will be avoided, and it will be easier to effect the necessary interchange between different siloxane units in the formation of the ultimate copolymer composition.

During the addition of the cesium hydroxide, intimate stirring is advantageously employed to effect homogeneous dispersion of the cesium hydroxide in the mixture of ingredients. When using, for instance, 0.05%, by weight, cesium hydroxide, it will be found that within 1 to 5 minutes after adding cesium hydroxide, reaction will begin to take place and that in a relatively short period of time of the order of about 5 to 10 minutes after the cesium hydroxide has been added, the reaction is substantially completed without further heating required. In contrast to this we found that when, for instance, octamethylcyclotetrasiloxane is mixed with, for example, hexaphenylcyclotrisiloxane, or octaphenylcyclotetrasiloxane, and the mixture heated, despite the presence of such alkali-metal hydroxides as, for instance, sodium hydroxide or potassium hydroxide, the incorporation of the cyclic diphenylsiloxane inhibits further polymerization of the cyclic dimethylsiloxane, which remains in a fluid or semi-fluid condition, even though increased heat or increased amounts of the condensing agent are employed.

By employing the above-described method together with the cesium hydroxide, it will be found that smooth intercondensation between cyclic dimethylsiloxanes and cyclic diphenylsiloxanes particularly cyclic hexaphenyltrisiloxane of the formula $[(C_6H_5)_2SiO]_3$ can be effected. In contrast to this it will be found that when one employs, for instance, other alkali-metal hydroxides, for example, potassium hydroxide, the presence of even small amounts of the cyclic hexaphenylcyclotrisiloxane will normally inhibit polymerization of the cyclic dimethylsiloxane to the desirable highly condensed state. An unexpected feature of the present invention is the fact that it is possible to polymerize mixtures of diorganosiloxanes containing high proportions (above 50 mol percent) of diaryl siloxane with cesium hydroxide at a rapid rate. Thus, we have observed that cesium hydroxide rapidly polymerizes molten hexaphenylcyclotrisiloxane to a glassy, hard polymer. The above-mentioned Hyde patent teaches that the intercondensation of cyclic dialkylsiloxanes in mixtures containing high proportions of diaryl siloxanes, or even the condensation pure cyclic diaryl siloxanes, is impossible with alkali-metal hydroxides. Although other alkali metal hydroxides such as sodium hydroxide or potassium hydroxide can be caused to effect such condensation reactions to some degree, the temperatures at which this is accomplished are so high that deleterious removal of organic radicals occurs with a consequent undesirable cross-linking of the polymers. This renders such condensed polymers unsuitable for use as a rubber compound with fillers which can be cured under usual conditions employed in making cured silicone rubber.

Among the unexpected features discovered in connection with the use of cesium hydroxide for effecting polymerization or condensation of polydiorganosiloxanes is the ability to effect the polymerization of polydimethylsiloxanes such as octamethylcyclotetrasiloxane to extremely viscous high molecular weight methylpolysiloxanes (or gums) suitable for the preparation of silicone elastomers at much lower temperatures, at lower concentrations of the basic polymerization promoters, and in considerably shorter periods of time than are required when equivalent weights of potassium hydroxide or even rubidium hydroxide are used as the promoter. Other advantages inherent in the use of the cesium hydroxide as the polymerizing agent are a reduced degree of dealkylation and cross-linking of the formed polymer owing to the lower processing temperatures required, which can be as low as 75° C., and the smaller residue of cesium hydroxide (or metal silanolate salt) remaining in the polymer.

For example, an amount of cesium hydroxide equivalent to less than one atom of cesium per 15,000 atoms of silicon is capable of effecting a rapid polymerization of octamethylcyclotetrasiloxane to a high molecular weight polymeric polydimethylsiloxane gum at 150° C. in a very short period of time; this concentration of cesium hydroxide does not represent a minimum limit on the amount of cesium hydroxide required to promote the polymerization reaction. This latter feature is important in order to retain the desirable physical properties of the high molecular weight polymer or of the elastomeric articles fabricated therefrom, during and after periods in which such materials are subjected to elevated temperatures since residual amounts of basic catalyst in the elastomeric materials are known to affect adversely the properties of these materials at elevated temperatures, the effect being proportional to the amount of residual base present. It also has been found that excessive amounts of the polymerization promoter (which are usually required when using, for instance, potassium hydroxide) tend to depress the molecular weight of the polymer ultimately obtained due to the fact that the previously employed alkali-metal hydroxides remain attached as chain-terminating units to the formed linear methylpolysiloxane so that increase in the molecular weight of such methylpolysiloxanes through linking up of adjacent linear methylpolysiloxane molecules is substantially inhibited. We have found that when using such alkali-metal hydroxides as, for instance, sodium hydroxide and lithium hydroxide, the latter are even less effective than potassium hydroxide in promoting the polymerization of the mixture of polydiorganosiloxanes in the desirable range of temperatures lower than 175° C. above which deleterious dealkylation reactions take place. Indeed, under the above conditions, lithium hydroxide appears to be ineffective in catalysing a condensation to a high molecular weight gum suitable for the preparation of elastomeric articles; and sodium hydroxide does not appear to be economically useful for this purpose under the desirable reaction conditions cited above.

In order that those skilled in the art may better understand how the present invention may be practiced, the following examples are given by way of illustration and not by way of limitation. All parts are by weight.

Example 1

In this example, a mixture of 40 parts hexaethylcyclotrisiloxane and 60 parts octamethylcyclotetrasiloxane were heated together at 150° C. and at this point about 0.2 part cesium hydroxide was added while stirring the mixture of ingredients. Within 5 minutes a smooth polymerization reaction ensued and went to completion as far as intercondensation of the diethylsiloxy and dimethylsiloxy units were concerned. The resulting stiff gum was compounded with 45%, by weight, thereof finely divided gamma aluminum oxide (as is more particularly described in Savage application Serial No. 295,339, filed June 24, 1952, now U. S. Patent 2,671,069, issued March 2, 1954) and 1.65%, by weight, thereof benzoyl peroxide. The mixture of ingredients was then pressed into the form of a flat sheet for 20 minutes at 125° C. at a pressure of about 500 p. s. i. The tensile strength of the sample at this point was 550 p. s. i. and the elongation at break was 1000%. After about 15 hours at 150° C., the tensile strength rose to 860 p. s. i. and the percent elongation was about 600%. This silicone rubber was extremely flexible at −78° C. (in a Dry Ice-acetone bath), and its flexibility was approximately the same at this temperature as it was at around room temperature. It retained a considerable measure of flexibility as low as −140° C. After 24 hours at −79° C., its modulus at this temperature was 560 p. s. i.; the modulus in a similar test at −85° C. was 805 p. s. i.

Attempts to employ potassium hydroxide in place of cesium hydroxide in the above intercondensation reaction proved unsuccessful and there was obtained only a soft fluid material which had little utility for the preparation of elastomer. An actual sample was prepared in which 40 weight percent of the octaethylcyclotetrasiloxane and 60 weight percent of the octamethylcyclotetrasiloxane was caused to react at about 150° to 160° C. for about 2 hours with 0.2% potassium hydroxide. Although condensation of a sort was obtained, when the fluid polymer was compounded in the same way as above, namely, with 45%, by weight, thereof gamma aluminum oxide and 1.65%, by weight, benzoyl peroxide, and pressed for 20 minutes at 125° C., a sticky rubber was produced which showed a tensile strength of only 130 p. s. i. This clearly showed the effect of having inadequate intercondensation between the diorganosiloxy units and points up the advantages of using the cesium hydroxide over the potassium hydroxide.

Example 2

A mixture of 80%, by weight, of 1,3,5-trimethyl-1,3,5-triethylcyclotrisiloxane and 20%, by weight, octamethylcyclotetrasiloxane was heated to a temperature of about 150° to 170° C. and thereafter about 0.1%, by weight, cesium hydroxide, based on the weight of the mixture of diorganosiloxanes, was added. After about 5 minutes of heating, a firm gum of high viscosity was obtained. This material was then compounded with 2%, by weight, benzoyl peroxide and 45%, by weight, of gamma alumina, and the compound was press-cured for 20 minutes at about 125° C. under a pressure of about 500 p. s. i. The sheet thus molded was heat-aged for 24 hours at 150° C. in an air-circulating oven and the resulting silicone rubber tested and found to have a tensile strength of 600 p. s. i. and an elongation at break of 500%. This rubber was extremely flexible when immersed in a Dry Ice-acetone mixture which was at a temperature of −78.5° C. Even when immersed in a slush of n-pentane at −130° C., the rubber remained flexible and could still be stretched.

Example 3

A mixture was prepared of about 20 parts octaphenylcyclotetrasiloxane and 180 parts of octamethylcyclotetrasiloxane. This mixture was then heated to about 175° C. at which point about 0.2 part powdered cesium hydroxide was added to the mixture. Whereas the diphenylsiloxane prior to addition of the cesium hydroxide was insoluble in the polymeric dimethylsiloxane, with the addition of cesium hydroxide, the former dissolved rapidly in the latter and within 5 minutes at the elevated temperature mentioned above, the whole mass set up to a very stiff and viscous gum. This gum was cooled and compounded with 45%, by weight, thereof silica aerogel (Santocel C) and 1.65%, by weight, thereof benzoyl peroxide, and heated and pressed in the same manner as was done in connection with the samples prepared in Example 2. After curing in the press, the resulting rubber had a tensile strength of about 835 p. s. i. and an elongation of about 350% at break. This rubber was flexible even when immersed in a mixture of solid $CO_2$ and acetone (about −78° C.).

Example 4

In this example a mixture of about 25 parts octaphenylcyclotetrasiloxane and 75 parts octamethylcyclotetrasiloxane was prepared and heated similarly as was done in Example 3. Thereafter the same proportion of cesium hydroxide was added when the temperature of the mixture of ingredients was at about 175° C. to give within 5 minutes a stiff gum. This gum was compounded with 45%, by weight, silica aerogel and 1.65%, by weight, benzoyl peroxide. After curing similarly as was done in Example 2, the rubber had a tensile strength of 720 p. s. i. and an elongation at break of 400%. This rubber, when immersed in a solid $CO_2$-acetone bath appeared to be almost as flexible at this temperature (−78° C.) at it was at room temperature, even though the sample was 160 mils thick. It could easily be bent and twisted in the sub-zero mixture. In contrast to the above when a much thinner sample of an all-methyl polysiloxane silicone rubber was immersed in the same Dry Ice-acetone bath, it became quite stiff and board-like in the cold mixture. A polymer prepared similarly, comprising, by weight, 20% of diphenylsiloxane and 80% of dimethylsiloxane had, when compounded with 45% of gum weight of Dupont GS silica and cured 64 hours at 150° C., a tensile strength of 1220 p. s. i. and an elongation at break of 600%. This polymer had the same low temperature flexibility.

Example 5

In this example a mixture of ingredients was prepared from 10 parts octaphenylcyclotetrasiloxane and 90 parts of octamethylcyclotetrasiloxane and the mixture heated to about 175° C. at which time about 0.02 part cesium hydroxide was added. This mixture gelled in about 5 minutes as soon as a reflux temperature of about 175° C. was reached with the cesium hydroxide present therein. This gum could also be compounded with various fillers to give useful silicone products having good heat resistance and low temperature flexibility.

Example 6

As pointed out previously in the intercondensation of octamethylcyclotetrasiloxane with octaphenylcyclotetrasiloxane, using potassium hydroxide as the condensing agent, the presence of small amounts of even as low as 0.1%, by weight, hexaphenylcyclotrisiloxane will inhibit the copolymerization reaction of the methyl and phenyl siloxanes. The efficacy of cesium hydroxide to overcome this difficulty is described in the present example. More particularly, 20 parts octaphenylcyclotetrasiloxane containing about 5.0%, by weight, hexaphenylcyclotrisiloxane, based on the weight of the octaphenylcyclotetrasiloxane, was added to 80 parts octamethylcyclotetrasiloxane and this mixture was heated to about 170° C. at which point 0.1 part cesium hydroxide was added. The heating was continued at this temperature. Although there was no apparent change at first, within 5 minutes the phenyl polysiloxanes had dissolved in the octamethylcyclotetrasiloxane as evidenced by the fact that the solution became clear whereas before it was turbid. After about 5 more minutes, the solution became more viscous and finally turned to a gum. This gum was compounded with 45 parts of Santocel and 1.6 parts benzoyl peroxide, and thereafter heated for 20 minutes at about 125° C. under a pressure of 500 p. s. i. in the form of a sheet. The rubber sheet was thereafter removed from the mold and heated for an additional 15 hours at about 150° C. at which time it was tested and found to have a tensile strength of 540 p. s. i. and a percent elongation of 300 percent. It is thus evident that despite the presence of the hexaphenylcyclotrisiloxane impurity, which will inhibit intercondensation reaction of cyclic polydimethylsiloxanes with octaphenylcyclotetrasiloxane using KOH as a condensing agent under equivalent conditions, nevertheless the cesium hydroxide caused intercondensation of the methylpolysiloxane with the octaphenylcyclotetrasiloxane to go smoothly and rapidly to give a useful high molecular product.

*Example 7*

As pointed out in Example 6, small amounts of the hexaphenylcyclotrisiloxane were found to inhibit the polymerization and co-condensation of polydimethylsiloxanes with octaphenylcyclotetrasiloxane. More particularly, 10 parts hexaphenylcyclotrisiloxane and 45 parts octamethylcyclotetrasiloxane were mixed together and heated to a temperature of about 170° C. at which time about 0.1 part cesium hydroxide was added. After 15 minutes at 170° C., there was obtained a gum which could be satisfactorily compounded with various fillers and curing agents to form cured products which had good tensile strength and elongation, and showed evidence there was actually an interpolymerization between the octamethylcyclotetrasiloxane and the hexaphenylcyclotrisiloxane.

Attempts to copolymerize the ingredients discovered in Example 7 using, for instance, sodium hydroxide, potassium hydroxide, or lithium hydroxide appeared to be unsuccessful even after several hours at the boiling point of the mixture, nor was any substantial increase in viscosity of the mixture apparent. It has been found that the ability of octaphenylcyclotetrasiloxane to copolymerize with octamethylcyclotetrasiloxane (a reaction generally limited to copolymerizations in which the amount of diphenylsiloxane does not exceed 15 percent of the weight of the mixture) is inhibited or nullified by the presence of even small amounts of hexaphenylcyclotrisiloxane. This necessitates an extensive and costly purification of the diphenylsiloxanes to remove the hexaphenylcyclotrisiloxane. However, the cesium hydroxide will promote the desired copolymerization regardless of the degree of contamination of the octaphenylcyclotetrasiloxane with the hexaphenylcyclotrisiloxane.

*Example 8*

A viscous gum suitable for the preparation of elastomers was prepared by copolymerizing 90 parts octamethylcyclotetrasiloxane and 10 parts of a mixture of methyl vinyl polysiloxane obtained by hydrolysis of methyl vinyl diethoxy silane. This mixture of ingredients was heated at about 150° C. at which point cesium hydroxide in about 0.01 part, by weight, was added and after a few minutes heating, a solid gum was obtained whose molecular weight was much greater than any of the molecular weights of the starting materials.

*Example 9*

A ternary copolymer was prepared by heating a mixture of ingredients comprising 79.8 parts of octamethylcyclotetrasiloxane, 20 parts octaphenylcyclotetrasiloxane, and 0.2 part 1,3,5,7-tetramethyl-1,3,5,7-tetravinylcyclotetrasiloxane to 150° C. at which point 0.01 part, by weight, cesium hydroxide was added. Within 20 minutes at this temperature, the mixture had copolymerized to a viscous gum suitable for the preparation of elastomeric articles. A sample of this gum was compounded with 45%, by weight, thereof finely divided gamma alumina, (Alon Fluffy) and 1.65%, by weight, benzoyl peroxide, and thereafter press-cured for 20 minutes at 125° C. under a pressure of about 500 p. s. i. This rubber had a tensile strength of 800 p. s. i. with an elongation at break of 1000%. It was flexible at temperatures as low as −80° C.

*Example 10*

In this example, pure hexaphenylcyclotrisiloxane was heated to its melting point and maintained there while about 0.1 percent, by weight thereof, cesium hydroxide was added with stirring. A rapid polymerization reaction ensued to give a hard, glassy material, indicating clearly the marked effect that the cesium hydroxide had on the hexaphenylcyclotrisiloxane as a polymerization catalyst. When, for instance, potassium hydroxide was substituted in place of the cesium hydroxide, no detectable polymerization reaction took place nor did the physical properties of the mixture of ingredients after carrying out the desired reaction at the temperature of the melting point of the hexaphenylcyclotrisiloxane change from the original physical properties of the latter polysiloxane.

It will, of course, be apparent to those skilled in the art that other proportions of the copolymerizable ingredients may be used without departing from the scope of the present invention. In general, for optimum results, both in ease of preparation and in properties, we have found that on a weight basis the cyclic polydimethylsiloxane advantageously comprises from 25 to 95 percent of the total weight of the latter and the other copolymerizable diorganosiloxanes, for instance, cyclic diphenylsiloxane, cyclic diethylsiloxane, cyclic methylphenylsiloxane, etc., comprises from 5 to 75%.

In addition, the temperature at which intercondensation of the diorganosiloxanes is carried out and the amount of cesium hydroxide used may obviously be varied within wide limits as are more particularly described above.

It is desired to point out that, although the above examples given by way of illustration include the use of only diorganosiloxanes for intercondensation purposes, it will, of course, be apparent to those skilled in the art that modifying amounts of intercondensed monoorganosiloxanes or triorganosiloxane units may also be present. Thus, in the hydrolysis of, for instance, dimethyldichlorosilane to obtain the cyclic dimethylsiloxanes employed in the instant invention, one may also incorporate small amounts of trimethylchlorosilane which, as a result of the hydrolysis product, form intercondensed trimethylsiloxy units. The presence of these small amounts of the order of about 0.02 mol percent triorganosiloxy units, for instance, trimethylsiloxy units, permits the obtaining of more reproducible results in the type of polymer obtained as a result of carrying out the condensation reaction.

The high molecular weight products herein described and prepared by the above-described methods (which may be highly viscous liquids or gummy solids, depending on the type of copolymerizing ingredients employed, the conditions under which the condensation is carried out, etc.) may be compounded with various fillers, for instance, silica aerogel used above, lithopone, talc, titanium dioxide, iron oxide, etc. (said fillers being present, by weight, in an amount equal to from 0.25 to 3 parts filler per part of the organopolysiloxanes convertible to the cured solid elastic state), and curing agents, such as tertiary butyl perbenzoate, etc. (equal to from 0.01 to 6% or more, by weight, based on the weight of the convertible organopolysiloxane), and thereafter molded at the elevated temperatures and pressure to give molded products which have utility as gaskets for applications requiring resistance to elevated temperatures for long periods of time while at the same time being capable of maintaining flexibility at low temperatures. The gummy or viscous materials herein described may, in addition to use in molding applications, be also dissolved and dispersed in various solvents or other liquid media to form coating compositions which can be used to coat various cloths including glass cloth, etc., which can then be fabricated into heater ducts having good heat resistance while at the same time maintaining the outstanding cold temperature flexibility.

In connection with the ability to prepare convertible (i. e., convertible to the cured, solid elastic state) highly viscous or gummy solids comprising intercondensed polymers of polydimethylsiloxane and polydiethylsiloxane, we have found that optimum compositions suitable for compounding with fillers and curing agents are obtained by condensing a mixture of polydialkylsiloxanes comprising on a weight basis, from 30 to 50% of a cyclic polysiloxane having the formula [(C$_2$H$_5$)$_2$SiO]$_n$ and from 50 to 70% of a cyclic polydimethylsiloxane having the formula [(CH$_3$)$_2$SiO]$_m$ where $m$ is an integer equal to from 3 to 9, and $n$ is an integer equal to from 3 to 5, inclusive. The intercondensed polymers produced by the use of the above-identified cesium hydroxide-containing agent can be compounded with various fillers, many examples of which have been given above, and curing agents, thereafter molded employing the usual molding methods to give cured silicone rubber products which remain flexible and strong at temperatures as low as −70 to −80° C. even when subjected to such low temperatures for extended periods of time.

What we claim as new and desire to secure by Letters Patent of the United States is:

1. The process which comprises forming a mixture of ingredients comprising (a) 25 to 95 per cent by weight of a cyclic polydimethylsiloxane having the formula [(CH$_3$)$_2$SiO]$_m$ and (b) 5 to 75 per cent by weight of a cyclic polysiloxane selected from the class consisting of (1) a cyclic polysiloxane having the formula

[(C$_2$H$_5$)$_2$SiO]$_n$ and (2) a cyclic polysiloxane having the formula

[(C$_6$H$_5$)$_2$SiO]$_p$ where $m$ is an integer equal to from 3 to 9, $n$ is an integer equal to from 3 to 5, and $p$ is an integer equal to from 3 to 4, inclusive, thereafter adding from 0.001 to 0.5%, by weight, based on the total weight of the mixture of (a) and (b) of cesium hydroxide to the above-described mixture of ingredients, and heating the mixture of the polyorganosiloxanes and cesium hydroxide to give a product of higher molecular weight than any of the original starting ingredients, in which product there are dimethylsiloxy units condensed with the other coreacting diorganosiloxy units.

2. The process which comprises forming a mixture of ingredients comprising (a) 25 to 95 per cent by weight octamethylcyclotetrasiloxane and (b) 5 to 75 per cent by weight octaphenylcyclotetrasiloxane, thereafter adding from 0.001 to 0.5%, by weight, based on the total weight of the mixture of (a) and (b) of cesium hydroxide to the above-described mixture of ingredients and heating the latter mixture to give a product of higher molecular weight than any of the original starting ingredients, in which product there are dimethylsiloxy units intercondensed with diphenylsiloxy units, and which product is suitable for compounding with filler and curing agent to yield upon heating a cured, solid, elastic product.

3. The process as in claim 2 in which the octaphenylcyclotetrasiloxane contains less than 5%, by weight, thereof of hexaphenylcyclotrisiloxane.

4. The process which comprises forming a mixture of ingredients comprising (a) 25 to 95 per cent by weight octamethylcyclotetrasiloxane and (b) 5 to 75 per cent by weight octaethylcyclotetrasiloxane, thereafter adding from 0.001 to 0.5%, by weight, based on the total weight of the mixture of (a) and (b) of cesium hydroxide to the above-described mixture of ingredients and heating the latter mixture to give a product of higher molecular weight than any of the original starting ingredients, in which product there are dimethylsiloxy units intercondensed with diethylsiloxy units and which product is suitable for compounding with a filler and curing agent to yield upon heating a cured, solid, elastic product.

5. The process which comprises forming a mixture of ingredients comprising, by weight (a) from 50 to 70% octamethylcyclotetrasiloxane and (b) from 30 to 50% octaethylcyclotetrasiloxane, heating the aforesaid mixture of ingredients to a temperature of from 100 to 150° C., adding from 0.001 to 0.5%, by weight, based on the weight of the mixture of polysiloxanes, of cesium hydroxide, and heating the latter mixture of ingredients to give a product of considerably higher molecular weight that any of the original starting ingredients, in which product there are dimethylsiloxy units intercondensed with diethylsiloxy units and which product is suitable for compounding with a filler and curing agent to yield upon heating a cured, solid, elastic product having good low temperature flexibility.

References Cited in the file of this patent

UNITED STATES PATENTS

| | | |
|---|---|---|
| 2,453,562 | Wright | Nov. 9, 1948 |
| 2,484,595 | Sprung | Oct. 11, 1949 |
| 2,490,357 | Hyde | Dec. 6, 1949 |
| 2,541,137 | Warrick | Feb. 13, 1951 |
| 2,634,284 | Hyde | Apr. 7, 1953 |

FOREIGN PATENTS

| | | |
|---|---|---|
| 583,878 | Great Britain | Jan. 1, 1947 |